US012756519B2

(12) United States Patent
Xiao et al.

(10) Patent No.: US 12,756,519 B2
(45) Date of Patent: Oct. 6, 2026

(54) REFERENCE SIGNAL TRANSMITTING METHOD AND APPARATUS

(71) Applicant: ZTE Corporation, Shenzhen (CN)

(72) Inventors: Huahua Xiao, Shenzhen (CN); Zhaohua Lu, Shenzhen (CN); Chuangxin Jiang, Shenzhen (CN); Lun Li, Shenzhen (CN); Hao Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 312 days.

(21) Appl. No.: 18/687,931

(22) PCT Filed: Sep. 1, 2022

(86) PCT No.: PCT/CN2022/116594
§ 371 (c)(1),
(2) Date: Feb. 29, 2024

(87) PCT Pub. No.: WO2023/030464
PCT Pub. Date: Mar. 9, 2023

(65) Prior Publication Data

US 2024/0380546 A1 Nov. 14, 2024

(30) Foreign Application Priority Data

Sep. 2, 2021 (CN) ......................... 202111028814.2

(51) Int. Cl.
*H04L 5/00* (2006.01)
*H04L 1/00* (2006.01)
*H04L 61/2517* (2022.01)

(52) U.S. Cl.
CPC .......... *H04L 5/0051* (2013.01); *H04L 1/0003* (2013.01); *H04L 61/2517* (2013.01)

(58) Field of Classification Search
CPC .. H04L 5/0051; H04L 1/0003; H04L 61/2517
See application file for complete search history.

(56) References Cited

U.S. PATENT DOCUMENTS

2017/0064673 A1* 3/2017 Li ......................... H04W 72/23
2018/0110057 A1* 4/2018 Park .................. H04W 74/0808
(Continued)

FOREIGN PATENT DOCUMENTS

CN 108111291 A 6/2018
CN 109391456 A 2/2019
(Continued)

OTHER PUBLICATIONS

International Search Report for corresponding application PCT/CN2022/116594 filed Sep. 1, 2022; Mail date Nov. 30, 2022.
(Continued)

*Primary Examiner* — Duc C Ho
(74) *Attorney, Agent, or Firm* — CANTOR COLBURN LLP

(57) ABSTRACT

Embodiments of the present disclosure provide a reference signal transmitting method and apparatus. The method includes: reference signal parameters are received, the reference signal parameters at least include the number P of ports of a reference signal and a modulation and coding scheme of the reference signal, and the number P of ports of the reference signal is determined according to the modulation and coding scheme; and the reference signal is received according to the reference signal parameters. The problem that in the related technologies, channel estimation is performed through demodulation reference signals, and when transmitted modulation information is demodulated on an estimated channel, there is an excessive demodulation reference signal overhead can be solved.

19 Claims, 3 Drawing Sheets

(56) References Cited

U.S. PATENT DOCUMENTS

| | | | | |
|---|---|---|---|---|
| 2018/0205589 | A1* | 7/2018 | Bai | H04L 27/2672 |
| 2019/0068308 | A1 | 2/2019 | Shin et al. | |
| 2021/0075453 | A1* | 3/2021 | Lee | H04L 5/0048 |
| 2021/0167921 | A1 | 6/2021 | Lee et al. | |
| 2022/0038933 | A1* | 2/2022 | Ma | H04L 41/0681 |

FOREIGN PATENT DOCUMENTS

| | | | |
|---|---|---|---|
| CN | 110535600 | A | 12/2019 |
| CN | 110771115 | A | 2/2020 |
| EP | 3570473 | A2 | 11/2019 |
| WO | 2021029540 | A1 | 2/2021 |

OTHER PUBLICATIONS

European Search Report for corresponding application EP22863598; Mail date Dec. 13, 2024.

* cited by examiner

REFERENCE SIGNAL TRANSMITTING METHOD AND APPARATUS

CROSS-REFERENCE TO RELATED APPLICATION

The present disclosure is a national stage filing under 35 U.S.C. § 371 of international application number PCT/CN2022/116594, filed Sep. 1, 2022, which claims the benefit of priority of Chinese patent application No. CN202111028814.2, entitled "REFERENCE SIGNAL TRANSMITTING METHOD AND APPARATUS, filed on Sep. 2, 2021, the entire contents of which are incorporated herein by reference.

TECHNICAL FIELD

Embodiments of the present disclosure relate to the field of communication, and more particularly relate to a reference signal transmitting method and apparatus.

BACKGROUND

In a wireless communication system, modulation information is required to be transmitted, where the modulation information includes data and/or control information. The data is mainly transmitted on a physical downlink shared channel (PDSCH) or a physical uplink shared channel (PUSCH), while the control information is mainly transmitted on a physical downlink control channel (PDCCH) or a physical uplink control channel (PUCCH). To receive the modulation information, a sending end needs to send a demodulation reference signal (DMRS), and a receiving end receives the DMRS, estimates, according to the DMRS, a channel on a resource element (RE) where the DMRS is located, and obtains, according to the RE where the DMRS is located, a channel Hd on the RE carrying the transmitted modulation information is obtained through interpolation and other methods, and demodulates the modulation information according to the channel Hd. However, the method incurs an excessive DMRS overhead proportion in cases where the movement speed is high, such as exceeding 120 kilometers per hour, or a RE set transmitting the control information or data is small.

Effective solutions have not yet been proposed for the problem that in the related technologies, channel estimation is performed through the demodulation reference signal, and the transmitted modulation information is demodulated on the estimated channel, leading to an excessive demodulation reference signal overhead.

SUMMARY

Embodiments of the present disclosure provide a reference signal transmitting method and apparatus, so as to at least solve the problem that in the related technologies, channel estimation is performed through demodulation reference signals, and when transmitted modulation information is demodulated on an estimated channel, there is an excessive demodulation reference signal overhead.

According to an embodiment of the present disclosure, a reference signal transmitting method is provided, and includes:

reference signal parameters are received, where the reference signal parameters at least include the number P of ports of a reference signal and a modulation and coding scheme of the reference signal, and the number P of ports of the reference signal is determined according to the modulation and coding scheme;

the reference signal is received according to the reference signal parameters; and demodulation parameters are obtained according to the reference signal.

According to another embodiment of the present disclosure, a reference signal transmitting method is further provided and applied to a base station, and includes:

reference signal parameters are configured, where the reference signal parameters at least include the number P of ports of a reference signal and a modulation and coding scheme of the reference signal, and the number P of ports of the reference signal is determined according to the modulation and coding scheme;

the reference signal parameters are sent; and the reference signal is sent according to the reference signal parameters.

According to another embodiment of the present disclosure, a reference signal transmitting apparatus is further provided and applied to a terminal, and includes:

a first receiving module, configured to receive reference signal parameters, where the reference signal parameters at least include the number P of ports of a reference signal and a modulation and coding scheme of the reference signal, and the number P of ports of the reference signal is determined according to the modulation and coding scheme; and a second receiving module, configured to receive the reference signal according to the reference signal parameters.

According to another embodiment of the present disclosure, a reference signal transmitting apparatus is further provided and applied to a base station, and includes:

a configuration module, configured to configure reference signal parameters, where the reference signal parameters at least include the number P of ports of a reference signal and a modulation and coding scheme of the reference signal, and the number P of ports of the reference signal is determined according to the modulation and coding scheme;

a first sending module, configured to send the reference signal parameters; and a second sending module, configured to send the reference signal according to the reference signal parameters.

According to another embodiment of the present disclosure, a computer-readable storage medium is further provided, and the storage medium stores a computer program, where the computer program is configured to perform when executed by a processor, the steps of any one of the above method embodiments.

According to another embodiment of the present disclosure, an electronic device is further provided, and includes a memory and a processor. The memory stores a computer program, and the processor is configured to execute the computer program to perform the steps of any one of the above method embodiments.

DETAILED DESCRIPTION OF THE EMBODIMENTS

Figure 1:
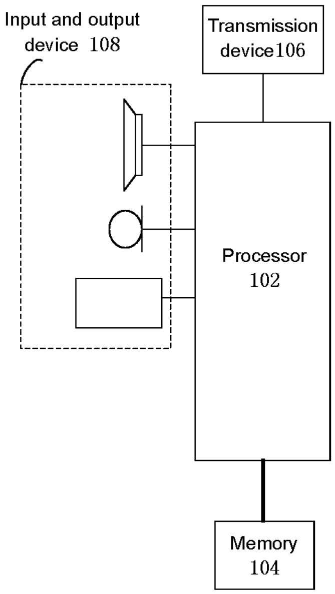
FIG. 1 is a block diagram of a hardware structure of a mobile terminal of a reference signal transmitting method according to an embodiment of the present disclosure.

Embodiments of the present disclosure are described in detail with reference to the accompanying drawings and in conjunction with embodiments as below.

It is to be noted that terms such as "first" and "second" of the specification and claims of the present disclosure and the above accompanying drawings are used to distinguish similar objects but are unnecessarily used to describe specific sequences or precedence orders.

It is to be noted that in the embodiments of the present disclosure, terminals may include a mobile phone, a data block, a notebook, and various movable manufacturing devices in factories, which are not specifically limited by the embodiments of the present disclosure. Base stations may include various macro base stations, micro base stations, home base stations (Home eNode B, or Femto), and ultra-micro base stations, which are not specifically limited by the embodiments of the present disclosure.

In the embodiments of the present disclosure, transmission includes sending or receiving.

In the embodiments of the present disclosure, modulation and coding schemes include a modulation scheme and/or an coding scheme, where the modulation scheme includes but not limited to binary phase shift keying (BPSK), quadrature phase shift keying (QPSK), and M-quadrature amplitude modulation (M-QAM), including 16QAM, 64QAM, 256QAM, 1024QAM, and 2048QAM with corresponding modulation symbol numbers of 2, 4, 16, 64, 256, 1024, and 2048, and corresponding modulation orders R of 1, 2, 4, 6, 8, 10, and 12. The modulation symbol numbers may also be other positive integers, such as 8 and 32, which are not limited by the embodiments.

In the embodiments of the present disclosure, a modulation symbol set includes at least one modulation symbol, which may be a modulation symbol corresponding to modulation information, or a set of modulation symbols corresponding to the modulation information, where a set of modulation symbols includes at least one modulation symbol. For example, the modulation information is modulated by a certain modulation scheme including M modulation symbols, and thus, one modulation symbol corresponds to one of the M modulation symbols. If the modulation information is simultaneously transmitted by N data streams, the modulation information corresponds to one modulation symbol set including ($S_1$, $S_2$, . . . , and $S_N$), where Si corresponds to one of the M modulation symbols, the modulation symbol set is one of K modulation symbol groups, and K=M^N. Certainly, modulation schemes corresponding to data in the modulation symbol set may also be different.

In the embodiments of the present disclosure, an artificial intelligence module may be a mapping module, or a classification module, or a clustering module, which may map the inputted modulation information to a modulation symbol or a modulation symbol set corresponding to the modulation information, where the artificial intelligence module may also be other modules with the same functions, which are all within the scope of protection of the solution as long as the same functions are achieved. Unless particularly specified, the modulation symbol set includes a case where only one modulation symbol is included.

In the embodiments of the present disclosure, the modulation information includes data or control information. In order to transmit the data or control information, channel coding is generally performed on a bit information stream corresponding to the data or control information, and the bit stream obtained after channel coding is mapped to a modulation symbol in a constellation diagram. One or more modulation symbols may also constitute a modulation symbol set, representing a combination of modulation symbols of the modulation information on the plurality of data streams.

The method embodiments provided in the embodiments of the present disclosure may be performed in a mobile terminal, a computer terminal, or similar arithmetic units. Taking operation on the mobile terminal as an example. FIG. 1 is a block diagram of a hardware structure of a mobile terminal for a reference signal transmitting method according to an embodiment of the present disclosure. As shown in FIG. 1, the mobile terminal may include one or more (only one is shown in FIG. 1) processors 102 (the processor 102 may include but not limited to a microcontroller unit (MCU), or a field-programmable gate array (FPGA), or another processing unit) and a memory 104 configured to store data. The mobile terminal may further include a transmission device 106 used for a communication function and an input and output device 108. Those of ordinary skill in the art can understand that the structure shown in FIG. 1 is merely illustrative, and does not limit the structure of the above mobile terminal. For example, the mobile terminal may further include more or fewer components than those shown in FIG. 1, or have a different configuration than that shown in FIG. 1.

The memory 104 may be configured to store computer programs, such as software programs and modules of application software, and computer programs corresponding to the reference signal transmitting method according to this embodiment of the present disclosure. The processor 102 performs, by running the computer programs stored in the memory 104, various functional applications and business chain address pool slice processing, thereby implementing the above method. The memory 104 may include a high-speed random access memory, and may also include a non-volatile memory, such as one or more magnetic storage apparatuses, a flash memory, or another nonvolatile solid-state memory. In some examples, the memory 104 may further include memories which are remotely set relative to the processor 102, and these remote memories may be connected to the mobile terminal through networks. The examples of the above networks include but not limited to an Internet, an intranet, a local area network, a mobile communication network, and a combination thereof.

The transmission device 106 is configured to receive or send data through a network. A specific example of the above networks may include a wireless network provided by a communication supplier of the mobile terminal. In an example, the transmission device 106 includes a network interface controller (NIC) which can be connected with other network devices through a base station so as to communicate with the Internet. In an example, the transmission device 106 may be a radio frequency (RF) module configured to communicate with the Internet in a wireless manner.

Figure 2:
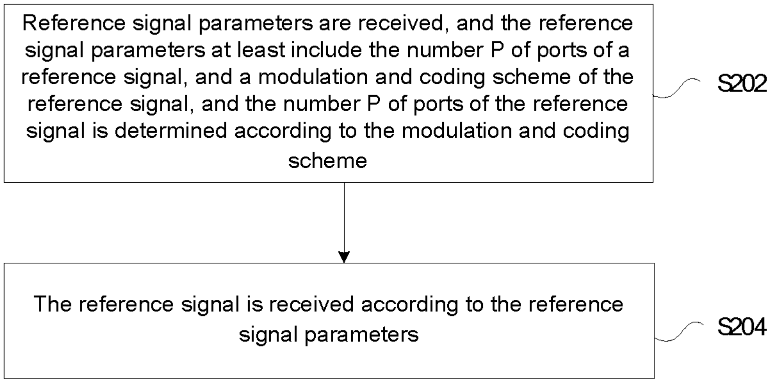
FIG. 2 is a first flowchart of a reference signal transmitting method according to an embodiment of the present disclosure.

This embodiment provides a reference signal transmitting method operating on the above mobile terminal or network architecture, which is applied to a terminal. The terminal can have access to a current master node MN cell and a current secondary node SN cell of a source region through dual connection (DC). FIG. 2 is a first flowchart of a reference signal transmitting method according to an embodiment of the present disclosure. As shown in FIG. 2, the method is applied to the terminal, and the process includes the following steps:

Step S202: reference signal parameters are received, and the reference signal parameters at least include the number P of ports of a reference signal, and a modulation and coding scheme of the reference signal, and the number P of ports of the reference signal is determined according to the modulation and coding scheme.

In this embodiment, the modulation and coding scheme includes a modulation scheme and/or a coding scheme.

Step S204: the reference signal is received according to the reference signal parameters.

Further, the reference signal is configured to demodulate modulation information corresponding to the reference signal. For example, demodulation parameters are obtained according to the reference signal, the modulation information corresponding to the reference signal is mapped to a modulation symbol set corresponding to the modulation information according to the demodulation parameters, the demodulation parameters are obtained based on the reference signal, and through the demodulation parameters, the received modulation information can be directly mapped to a modulation symbol or modulation symbol set corresponding to the modulation information, thereby achieving the purpose of direct demodulation of the modulation information without channel estimation, and further reducing the reference signal overhead.

In this embodiment, step S204 specifically may include: at least one of a pattern of the reference signal, a sequence of the reference signal, and a time domain category of the reference signal is determined according to the reference signal parameters; and the reference signal is received on a resource element (RE) determined according to at least one of the pattern of the reference signal, the sequence of the reference signal, and the time domain category of the reference signal, where the time domain category of the reference signal includes periodic, aperiodic, and semi-persistent.

Through steps S202 to S204, the problem that in the related technologies, channel estimation is performed through demodulation reference signals, and when the transmitted modulation information is demodulated on an estimated channel, there is an excessive demodulation reference signal overhead can be solved. The reference signal is received according to the reference signal parameters, and the reference signal is used for demodulation of the modulation information corresponding to the reference signal, thereby achieving the purpose of direct demodulation of the modulation information without channel estimation, and further reducing the reference signal overhead.

In an embodiment, after step S204, the modulation information is received; and a modulation symbol or a modulation symbol set corresponding to the modulation information is determined according to the obtained demodulation parameters. As a preferred solution, the demodulation parameters may be network parameters corresponding to the artificial intelligence model, and the artificial intelligence model can adopt the received modulation information as an input, and output the modulation symbol or the modulation symbol set corresponding to the modulation information.

In an embodiment, the reference signal parameters include the number P of ports of a reference signal and a modulation and coding scheme of the reference signal, and the number P of ports of the reference signal is determined according to the modulation and coding scheme.

In an embodiment, the reference signal parameters include a modulation and coding scheme and the number P of ports, where the number P of ports is determined by the number M of modulation symbols corresponding to the modulation and coding scheme, $P \geq M$, and P and M are integers greater than 1.

In an embodiment, the reference signal parameters include the number N of transmitted data streams, a modulation and coding scheme, and the number P of ports, where the number P of ports is determined by the number N of data streams and the number M of modulation symbols corresponding to the modulation and coding scheme, $P \geq M\hat{}N$, P and M are integers greater than 1. N is a positive integer, and ^ represents exponentiation.

In an embodiment, the reference signal parameters include the number N of data streams, a modulation and coding scheme, and the number P of ports, where the number P of ports is determined by the number $M_i$ of modulation symbols corresponding to the modulation and coding scheme on the N data streams, $P \geq M_1 * M_2 * \ldots * M_N$, P and $M_i$ are integers greater than 1, $i=1, \ldots,$ and N, and N is a positive integer.

In an embodiment, the reference signal is configured to demodulate modulation information corresponding to the reference signal. In an embodiment, demodulation parameters of the artificial intelligence module are obtained through training according to the reference signal, and according to the demodulation parameters, the modulation information is mapped to a modulation symbol set corresponding to the modulation information. Further, modulation and coding schemes corresponding to the reference signal and the modulation information are the same; and/or, pre-coding corresponding to the reference signal and the modulation information is the same; and/or, the number of data streams corresponding to the reference signal and the modulation information is the same; and/or, modulation and coding schemes corresponding to the reference signal and the modulation information on each corresponding data stream are the same, and/or, modulation symbol sets corresponding to the reference signal and the modulation information are the same.

In another embodiment, the method further includes: a power ratio parameter A is received, where the power ratio parameter A is a ratio of power for transmitting the reference signal to power for transmitting the modulation information; and power for receiving the modulation information is adjusted according to the power ratio parameter A.

In an embodiment, the modulation information corresponds to one of K modulation symbol sets, where the modulation symbol set includes a set of N modulation symbols, N is the number of data streams corresponding to the modulation information, N is an integer greater than or equal to 1, and K is an integer greater than 1.

In an embodiment, the number K of modulation symbol sets is determined by the number M of modulation symbols corresponding to the modulation and coding scheme, where K=M.

In an embodiment, the number K of modulation symbol sets is determined by the number M of modulation symbols corresponding to the modulation and coding scheme and the number N of transmitted data streams, where K=M^N, K and M are integers greater than 1, N is a positive integer, and ^ represents exponentiation.

In an embodiment, the number K of modulation symbol sets is determined by the number Mi of modulation symbols corresponding to the modulation and coding scheme on N data streams, where $K=M_1*M_2* \ldots *M_N$, K and $M_i$ are integers greater than 1, i=1, . . . , and N, and N is a positive integer.

In an embodiment, the number of reference signal ports corresponding to each of the K modulation symbol sets is the same, the number of reference signal ports corresponding to each modulation symbol set is uniform. For example, each modulation symbol set corresponds to 2 reference signal ports, one reference signal port may include a plurality of resource elements (REs), and the REs on each reference signal port transmit one modulation symbol set (which may be a modulation symbol).

In an embodiment, the reference signal includes at least one of a train reference signal and a demodulation reference signal. The train reference signal is used for training the network parameters of the artificial intelligence model and is transmitted on a RE set, such as independently-partitioned REs, with a time-domain symbol index smaller than a time-domain symbol index corresponding to REs corresponding to the modulation information. The demodulation reference signal is used for estimating a channel of the REs on the demodulation reference signal, which may be used for conventional demodulation of modulation signals and may also be used for training the network parameters of the artificial intelligence model.

Figure 3:
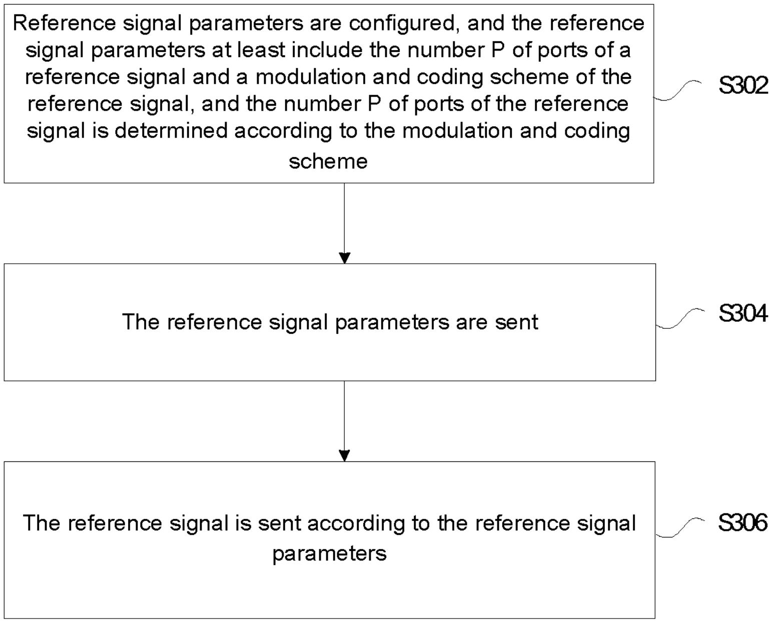
FIG. 3 is a second flowchart of a reference signal transmitting method according to an embodiment of the present disclosure.

According to another aspect of an embodiment, a reference signal transmitting method is further provided. FIG. 3 is a second flowchart of the reference signal transmitting method according to this embodiment of the present disclosure. As shown in FIG. 3, the transmitting method is applied to a base station, and the process includes following steps:

Step S302: reference signal parameters are configured, and the reference signal parameters at least include the number P of ports of a reference signal and a modulation and coding scheme of the reference signal, and the number P of ports of the reference signal is determined according to the modulation and coding scheme.

Step S304: the reference signal parameters are sent.

Step S306: the reference signal is sent according to the reference signal parameters.

Further, the reference signal in this embodiment may be used for obtaining demodulation parameters.

Through steps S302 to S306, the problem that in the related technologies, channel estimation is performed through demodulation reference signals, and when the transmitted modulation information is demodulated on an estimated channel, there is an excessive demodulation reference signal overhead can be solved. The reference signal is received according to the reference signal parameters, and the reference signal is used for processing demodulation of the modulation information corresponding to the reference signal, thereby achieving the purpose of direct demodulation of the modulation information without channel estimation, and further reducing the reference signal overhead.

In an embodiment, after step S306, the modulation information is sent; the reference signal is used for indicating a terminal to obtain demodulation parameters; and the modulation information is demodulated according to the demodulation parameters.

In an embodiment, the reference signal parameters include the number P of ports of a reference signal and a modulation and coding scheme of the reference signal, and the number P of ports of the reference signal may be determined according to the modulation and coding scheme.

In an embodiment, the reference signal parameters include a modulation and coding scheme and the number P of ports, where the number P of ports is determined by the number M of modulation symbols corresponding to the modulation and coding scheme, P≥M, and P and M are integers greater than 1.

In an embodiment, the reference signal parameters include the number N of transmitted data streams, a modulation and coding scheme, and the number P of ports, where the number P of ports is determined by the number N of data streams and the number M of modulation symbols corresponding to the modulation and coding scheme, P≥M^N, P and M are integers greater than 1, N is a positive integer, and ^ represents exponentiation.

In an embodiment, the reference signal parameters include the number N of data streams, a modulation and coding scheme, and the number P of ports, where the number P of ports is determined by the number Mi of modulation symbols corresponding to the modulation and coding scheme on the N data streams, $P \geq M_1*M_2* \ldots *M_N$, P and $M_i$ are integers greater than 1, i=1, . . . , and N, and N is a positive integer.

In an embodiment, the reference signal parameter is used for indicating the terminal to determine at least one of a pattern of the reference signal, a sequence of the reference signal, and a time domain category of the reference signal; and the reference signal is received on a resource element (RE) determined according to at least one of the pattern of the reference signal, the sequence of the reference signal, and the time domain category of the reference signal, Herein, the time domain category of the reference signal includes periodic, aperiodic, and semi-persistent.

In an embodiment, the reference signal is used for demodulating the modulation information corresponding to the reference signal, and modulation and coding schemes corresponding to the reference signal and the modulation information are the same; and/or, pre-coding corresponding to the reference signal and the modulation information is the same; and/or, the number of data streams corresponding to the reference signal and the modulation information is the same; and/or, modulation and coding schemes corresponding to the reference signal and the modulation information on each corresponding data stream are the same, and/or, modulation symbol sets corresponding to the reference signal and the modulation information are the same.

In an embodiment, the method further includes:

a power ratio parameter A is sent, where the power ratio parameter A is a ratio of power for transmitting the reference signal to power for transmitting the modulation information, and the power ratio parameter A is used for indicating the terminal to adjust the power of the modulation information.

In an embodiment, the modulation information corresponds to one of K modulation symbol sets, where the modulation symbol set includes a set of N modulation symbols, N is the number of data streams corresponding to the modulation information, N is an integer greater than or equal to 1, and K is an integer greater than 1.

In an embodiment, the number K of modulation symbol sets is determined by the number M of modulation symbols corresponding to the modulation and coding scheme, where K=M.

In an embodiment, the number K of modulation symbol sets is determined by the number M of modulation symbols corresponding to the modulation and coding scheme and the number N of transmitted data streams, where K=M^N, K and M are integers greater than 1, N is a positive integer, and ^ represents exponentiation.

In an embodiment, the number K of modulation symbol sets is determined by the number Mi of modulation symbols corresponding to the modulation and coding scheme on N data streams, where $K=M_1*M_2* \ldots *M_N$, K and $M_i$ are integers greater than 1, i=1, . . . , and N, and N is a positive integer.

In an embodiment, the number of reference signal ports corresponding to each of the K modulation symbol sets is the same.

In an embodiment, the reference signal includes at least one of a train reference signal and a demodulation reference signal.

Figure 4:
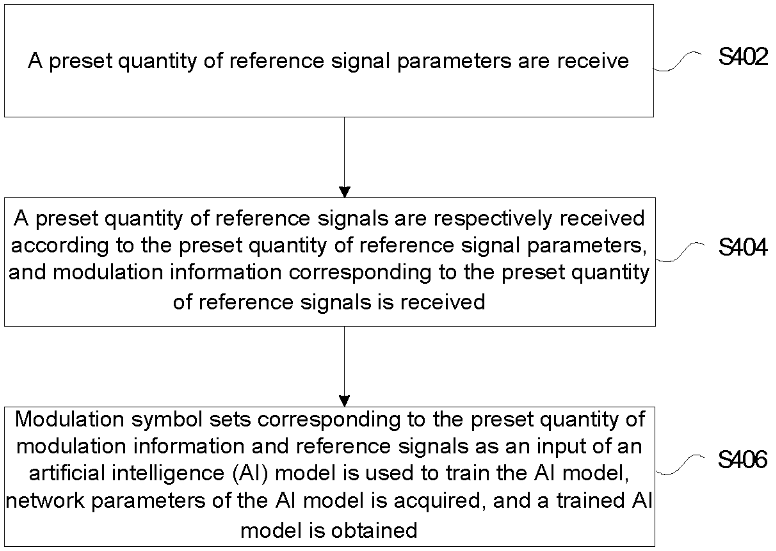
FIG. 4 is a third flowchart of a reference signal transmitting method according to an embodiment of the present disclosure.

In an embodiment, a reference signal transmitting method is further provided. FIG. 4 is a third flowchart of the reference signal transmitting method according to this embodiment of the present disclosure. As shown in FIG. 4, the transmitting method is applied to a terminal, and includes:

Step S402: a preset quantity of reference signal parameters are receive.

Step S404: a preset quantity of reference signals are respectively received according to the preset quantity of reference signal parameters, and modulation information corresponding to the preset quantity of reference signals is received, where each reference signal corresponds to one modulation symbol set, and modulation symbols corresponding to the modulation symbol set may be determined according to a predetermined manner, which for example, may be determined by a receiving end according to a predetermined manner or a manner configured by a sending end, and may serve as labels.

One reference signal corresponds to at least one piece of modulation information, while a modulation symbol set corresponding to the modulation information is unknown, which needs to be demodulated by a terminal so as to obtain a value of the modulation symbol set.

Step S406: modulation symbol sets corresponding to the preset quantity of modulation information and reference signals as an input of an artificial intelligence (AI) model is used to train the AI model, network parameters of the AI model is acquired, and a trained AI model is obtained, where the network parameters may also be referred to as demodulation parameters (the demodulation parameters in this embodiment may also be referred to as mapping parameters). The demodulation parameters may map the received modulation information to the modulation symbol sets corresponding to the modulation information. In a specific example, the received modulation information serves as an input of the trained AI model, and therefore, an output of the AI model is modulation symbol sets corresponding to the modulation information.

Through steps S402 to S406, the problem that in the related technologies, channel estimation is performed through demodulation reference signal, and when the transmitted modulation information is demodulated on an estimated channel, there is an excessive demodulation reference signal overhead can be solved. The preset quantity of reference signals are used for training the AI model to obtain the network parameters or the demodulation parameters of the AI model, and the demodulation parameters can directly map the received modulation information to the modulation symbol sets corresponding to the modulation information, thereby achieving the purpose of direct demodulation of the modulation information without channel estimation, and further reducing the reference signal overhead.

In an embodiment, after step S406, the modulation information is received; the modulation information is inputted into the trained AI model to obtain modulation symbol sets corresponding to the modulation information outputted by the AI model, thereby demodulating the modulation information.

The following is an example of using the modulation information as control information or data to describe this embodiment.

In this embodiment, the reception of the reference signals includes: receiving reference signal parameters; determining the reference signals based on the reference signal parameters; and receiving the reference signals, where the reference signals are used for obtaining a mapping relationship from the received signals to the modulation symbols.

Further, the reference signal parameters include a modulation and coding scheme and the number P of ports, and the number of ports is determined by the number M of modulation symbols corresponding to the modulation and coding scheme, where P≥M, and P and M are integers greater than 1.

Further, the reference signal parameters include the number N of data streams, a modulation and coding scheme, and the number P of ports, and the number of ports is determined by the number N of data streams and the number M of modulation symbols corresponding to the modulation and coding scheme, where P≥M^N, P and M are integers greater than 1, N is a positive integer, and ^ represents exponentiation.

Further, the reference signal parameters include the number N of data streams, a modulation and coding scheme, and the number P of ports, and the number of ports is determined by the number Mi of modulation symbols corresponding to the modulation and coding scheme on the N data streams, where $P \geq M_1*M_2* \ldots *M_N$, P and are integers greater than 1, i=1, . . . , and N, and N is a positive integer.

Further, the received signals include received reference signals and/or received data, where the received data includes data received on at least one of a received physical uplink shared channel, a received physical downlink shared channel, a received physical uplink control channel, and a received physical downlink control channel.

Preferably, at least one of the following is included:

modulation and coding schemes corresponding to the reference signals and data are the same; and/or, pre-coding corresponding to the reference signals and data is the same; and/or, the number of data streams corresponding to the reference signals and data is the same; and/or, modulation and coding schemes corresponding to the reference signals and data on each corresponding data stream are the same.

Preferably, a ratio of power for transmitting the reference signals to power for transmitting the data is a power ratio A, and power of the data is determined according to the power ratio A.

Further, the modulation information corresponds to one of K modulation symbol sets, where the modulation symbol set includes a combination of N modulation symbols, N is the number of data streams corresponding to the modulation information, N is an integer greater than or equal to 1, and K is an integer greater than 1.

Preferably, the number K of modulation symbol sets is determined by the number M of modulation symbols corresponding to the modulation and coding scheme, where K=M.

Preferably, the number K of modulation symbol sets is determined by the number M of modulation symbols corresponding to the modulation and coding scheme and the number N of transmitted data streams, where K=M^N, K and M are integers greater than 1, N is a positive integer, and ^ represents exponentiation.

Preferably, the number K of modulation symbol sets is determined by the number $M_i$ of modulation symbols corresponding to the modulation and coding scheme on N data streams, where $K=M_1*M_2* \ldots *M_N$, K and $M_i$ are integers greater than 1, i=1, . . . , and N, and N is a positive integer.

Preferably, the reference signal parameters include at least one of the following: a pattern of a reference signal, a sequence initial value of the reference signal, and a time domain category of the reference signal, where the time domain category of the reference signal includes periodic, aperiodic, and semi-persistent.

Preferably, the reference signal includes at least one of a train reference signal and a demodulation reference signal.

An index and an indicator in this embodiment may be interchangeable. Transmission includes sending or receiving; terminals may be various mobile devices, such as a mobile phone, a data block, a notebook, and various manufacturing devices in factories; and base stations include various macro base stations, micro base stations, home base stations, and ultra-micro base stations, the sending end in a downlink is a base station, and is a terminal in an uplink, and the receiving end is a terminal in the downlink, and is a base station in the uplink. In this specification, signal transmission includes at least one of data or control signal transmission and reference signal transmission, where transmitted data includes data on a physical downlink shared channel (PDSCH) or a physical uplink shared channel (PUSCH), transmitted control signals include control signals on a physical downlink control channel (PDCCH) or a physical uplink control channel (PUCCH), and reference signals include a train reference signal and/or a demodulation reference signal. The demodulation reference signal is a reference signal used for acquiring the PUSCH/PDSCH/PUCCH/PDCCH in a wireless communication system, and is widely applied to a long term evolution (LTE), a new radio (NR), and a future wireless communication system.

In this embodiment, the number of data streams refers to the number of data streams simultaneously transmitted in the same time-frequency resource in a multiple-input multiple-output system, which are also referred to as layers, or data streams, transmission blocks, and channel ranks in some literature.

The mapping module in this specification includes but not limited to one of the following: an artificial intelligence (AI) module, a machine learning module, a classification module, a clustering module, and other functional modules capable of classifying modulation signals.

Figure 5:
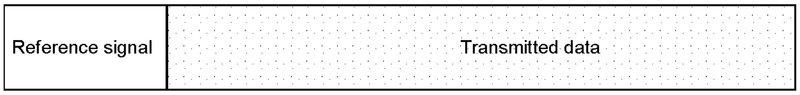
FIG. 5 is a structural block diagram of a reference signal according to the present embodiment.

In a wireless communication system, at least one base station and one terminal are included. The base station configures reference signal parameters. The reference signal parameters are used for determining a reference signal. For example, the reference signal parameters include a reference signal category, a sequence initial value of the reference signal, the number P of ports, a modulation and coding scheme, a corresponding modulation and coding scheme order M, a pre-coding matrix, and a corresponding number N of data streams. Reference signals are configured as periodic reference signals, aperiodic reference signals, and semi-persistent reference signals according to the time domain category. The periodic reference signals are transmitted once at intervals of T time intervals after a slot offset. The aperiodic reference signals are triggered to be transmitted once as required by the terminal. The semi-persistent reference signals are transmitted once at intervals of T time intervals after a slot offset, but are not transmitted after deactivation until reactivated. The reference signal herein may be a reference signal for training the artificial intelligence module, such as a train reference signal. FIG. 5 is a structural block diagram of a reference signal according to the present embodiment. As shown in FIG. 5, starting after an offset, the reference signal is transmitted once at intervals of T time intervals, and data or control signals are transmitted after the reference signal. The sequence initial value of the reference signal is used for generating a reference signal sequence; and the modulation and coding scheme includes but not limited to binary phase shift keying (BPSK), quadrature phase shift keying (QPSK), and M-quadrature amplitude modulation (M-QAM), including 16QAM, 64QAM, 256QAM, 1024QAM, and 2048QAM with corresponding modulation symbol numbers of 2, 4, 16, 64, 256, 1024, and 2048, and corresponding modulation orders R of 1, 2, 4, 6, 8, 10, and 12. The modulation symbol numbers herein may also be other positive integers, such as 8 and 32. The number of data streams represents the number of data streams simultaneously transmitted, and N may be a positive integer, such as a positive integer less than or equal to 8. The number of data streams is the number of data streams simultaneously transmitted by the base station, which may be different layers of the same user, or may be different layers of a multiple-user multiple-input multiple-output (MU-MIMO) constituted by a plurality of users. Each layer may correspond to a different modulation and coding scheme. N data streams correspond to two transmission blocks. Modulation and coding schemes of layers in each transport block are the same, but modulation and coding schemes corresponding to layers corresponding to different transport blocks are different.

For a modulation and coding scheme with M modulation symbols, a signal transmitted in each data stream is typically one of the M modulation symbols. For example, QPSK has 4 modulation symbols, respectively denoted as $Q_{4,i}$ and i=1, 2, 3, and 4, while 16QAM correspondingly has 16 modulation symbols, respectively denoted as $Q_{16,i}$, and i=1, . . . , and 16, and so on. For a modulation and coding scheme with the modulation order of R, 2^R modulation symbols are included, where R is the number of bits capable of being represented by one symbol in the modulation and coding scheme. The modulation order is in one-to-one correspondence with the number of modulation symbols. The relationship between the modulation order R and the number M of modulation symbols is R=log 2 (M), where log 2 is a logarithm with base 2. Each symbol in the modulation symbols is a complex number, which represents a point in the constellation diagram, and is also referred to as a constellation point sometimes.

The terminal receives reference signal parameters configured by the base station, determines a pattern and a slot for receiving a reference signal according to the reference signal parameters, and receives the reference signal on a RE corresponding to the pattern of the reference signal. Information such as the number of modulation symbols of the reference signal, the number of ports, the number of transmitted data streams, a modulation and coding scheme on each data stream, and pre-coding are determined according to the reference signal parameters. A mapping relationship from the reference signal to the modulation symbols is obtained according to the modulation and coding scheme and the number of transmitted data streams.

Figure 6:
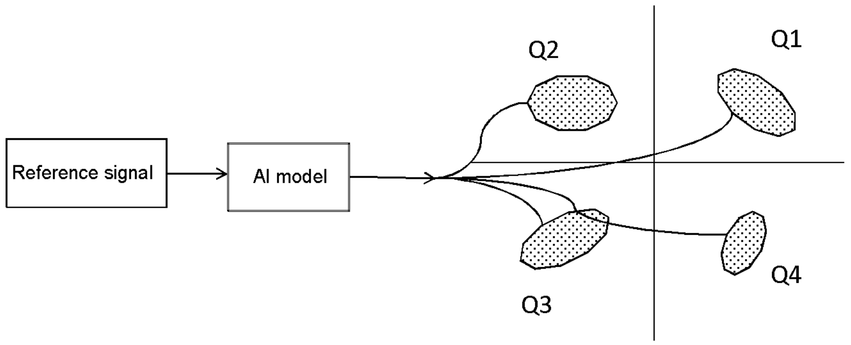
FIG. 6 is a schematic diagram of AI-based data transmission according to the present embodiment.

In this embodiment, at least one base station and one terminal are included. The base station sends one data stream. Assuming that the modulation and coding scheme used by the reference signal is QPSK, one of 4 modulation symbols is transmitted on each RE, such as $Q_{4,i}$, for simplicity, the subscript 4 is omitted, and it is denoted as $Q_i$, i=1, . . . , and M, where M is 4. It is to be noted that the method in this embodiment may also be applied to other modulation and coding schemes without limitation, such as 16QAM and 64QAM. The corresponding M is the number of modulation symbols corresponding to the modulation and coding scheme. FIG. 6 is a schematic diagram of AI-based data transmission according to the present embodiment. As shown in FIG. 6, after a base station sends reference signal parameters and a reference signal, a terminal receives the reference signal parameters, and determines the reference signal according to the reference signal parameters including a pattern, a reception slot, and a sequence of the reference signal, thereby determining which modulation symbol is transmitted on each RE as a label. The terminal receives the reference signal, which is, for example, denoted as $y_j=h_jq_j+n_j$, where $y_j$, $h_j$, $q_j$, $n_j$ respectively represent a reference signal received on a $j^{th}$ RE for transmitting the reference signal, a channel, a modulation symbol (one of M modulation symbols $Q_i$, where i=1, . . . , and M), and interference noise. By inputting the received signal to the mapping module, such as the AI module, the machine learning module, a deep learning module, and other modules with classification or mapping functions, the received signal is inputted to the mapping module according to $y_j$ and a corresponding label $q_j$, thereby mapping $y_j$ to one of M classifications, and each of M classifications corresponds to one modulation symbol. Parameters of the mapping module are obtained by training a plurality of samples, such as values of neural network parameters corresponding to AI, j=1, . . . , and Nc, and Nc is the number of REs occupied by reference signals configured by the base station.

After the parameters of the mapping module are obtained, the base station transmits data, the transmitted data includes but not limited to one of PDSCH/PDCCH, and for the uplink, the terminal transmits the data, including but not limited to PUSCH and PUCCH. The value of the data sent by the sending end on an $i^{th}$ RE is $y_i$. Because there are no labels in the data transmission stage, which one of modulation symbols the data is cannot be known. The transmitted data received at the receiving end is $y_i=h_is_i+n_i$, where $y_i$, $h_i$, $s_i$, $n_i$ are data received on the $i^{th}$ RE for data transmission, a channel, transmitted data, and interference noise. By inputting $y_i$ to the mapping module, a corresponding modulation symbol is mapped out through the parameters of the mapping module, such as one of $Q_i$, i=1, . . . , and M, thereby demodulating the data on the $i^{th}$ RE. In this embodiment, estimation of a channel hi is not required, and the modulation symbol of the received data $y_i$ can be directly obtained through the mapping module. In this embodiment, the number P of ports corresponding to the reference signal is required to be greater than or equal to M, that is, the number of ports is required to be equal to the number of modulation symbols, and because there is only one data stream, the number K of modulation symbol sets is equal to M.

In this embodiment, if power for sending the reference signal is different from power for sending the data, for example, the ratio is A, the A is required to be sent to the receiving end, and the receiving end multiplies the A by yi as the input of the mapping module. Alternatively, the ratio of the signal quality P1 of the received reference signal to the signal quality P2 of the received data is A, and the user multiplies the A by vi as the input of the mapping module. The signal quality may be received power, a received signal-to-noise ratio, and a received signal-to-interference-plus-noise ratio.

In this embodiment, at least one base station and one terminal are included. The base station sends N data streams. Assuming that the modulation and coding scheme used by the reference signal on each stream is QPSK, one of 4 modulation symbols is transmitted on each RE, such as $Q_{4,i}$, for simplicity, the subscript 4 is omitted, and it is denoted as $Q_i$, i=1, . . . , and M, where M is 4. It is to be noted that the method in this embodiment may also be applied to other modulation and coding schemes without limitation, such as 16QAM and 64QAM. The corresponding M is the number of modulation symbols corresponding to the modulation and coding scheme. After the base station sends the reference signal parameters and the reference signal, the terminal receives the reference signal parameters, and determines the reference signal according to the reference signal parameters including a pattern, a reception slot, and a sequence of the reference signal, thereby determining which modulation symbol is transmitted on each RE as a label. The terminal receives the reference signal, which is, for example, denoted as $Y_j=H_jR_j+N_j$, where $Y_j$, $H_j$, $R_j$, $N_j$ respectively represent a reference signal received on a $j^{th}$ RE for transmitting the reference signal, a channel, a modulation symbol set (one $R_i$ of K modulation symbol sets, where $R_i$ includes N modulation symbols, a $k^{th}$ modulation symbol is a modulation symbol on a $k^{th}$ stream, for example, when N is 2, ($q_m$, $q_n$),n,m=1, . . . , and M, and i=1, . . . , and K), and interference noise. $Y_j$, $R_j$, $N_j$ are vectors of 1*Nr. and $H_j$ is a complex matrix of Nr*Nt, where Nr and Nt are respectively the number of antennas of the sending end and the receiving end, which are both greater than or equal to the number N of streams.

A $k^{th}$ element of the vector $Y_j$ may be represented by $$y_{j,k}=\sum_{i=1}^{Nt}h_{j,k,i}q_{j,i}+n_{j,k},$$

where $h_{j,k,i}$ respectively represent channels from an $i^{th}$ sending antenna to a $k^{th}$ receiving antenna of $H_j$, $q_{j,i}$ represents a modulation symbol of an $i^{th}$ element of $R_j$, and $n_{j,k}$ represents a $k^{th}$ element of $N_j$. By inputting the received signal $y_{j,k}$ (k=1, . . . , and Nr) to the mapping module, such as the AI module, the machine learning module, the deep learning module, and other modules with classification or mapping functions, the received signal is inputted to the mapping module according to $y_{j,k}$ and a corresponding label $R_j$, where the label $R_j$ is also referred to as a modulation symbol set, such that $y_{j,k}$ is mapped to one of K modulation symbol sets, K=M^N. and each of K classifications corresponds to one modulation symbol set. Parameters of the mapping module are obtained by training a plurality of samples, such as values of neural network parameters corresponding to AI, j=1, . . . , and Nc, and Nc is the number of REs occupied by reference signals configured by the base station.

After the parameters of the mapping module are obtained, the base station transmits data, the transmitted data includes but not limited to one of PDSCH/PDCCH, and for the uplink, the terminal transmits the data, including but not limited to PUSCH and PUCCH. The value of the data sent by the sending end on the $i^{th}$ RE is $Y_i$. Because there are no labels in the data transmission stage, which one of modulation symbols the data is cannot be known. The transmitted data received at the receiving end is $Y_i=H_iS_i+N_i$, where $Y_i$, $H_i$, $S_i$, $N_i$ respectively represent received data on a $k^{th}$ RE, a channel, a transmitted data vector (one of K modulation symbol sets), and interference noise. $Y_i$, $S_i$, $N_i$ are vectors of 1*Nr, and $H_i$ is a complex matrix of Nr*Nt, where Nr and Nt are respectively the number of antennas of the sending end and the receiving end, which are both greater than or equal to the number N of streams. By inputting the received data $$y_{i,k} = \sum_{j=1}^{Nt} h_{i,k,j} s_{i,j} + n_{i,k}$$

on each receiving antenna to the mapping module, a corresponding modulation symbol set is mapped out through the parameters of the mapping module, such as one of the K modulation symbol sets, where K=M^N, such that the data on the $i^{th}$ RE is demodulated, $h_{i,k,j}$ respectively represent channels from a $j^{th}$ sending antenna to the $k^{th}$ receiving antenna of $H_i$, $s_{i,j}$ represents a modulation symbol of a $j^{th}$ element of $S_i$, and $n_{i,k}$ represents a $k^{th}$ element of $N_i$. By inputting the received signal $y_{i,k}$ (k=1, . . . , and Nr) to the mapping module, $y_{i,k}$ is mapped to one of the K modulation symbol sets. It is to be noted that the data streams may be a plurality of data streams of single-user MIMO or multiple-user MIMO. In this embodiment, the number P of ports corresponding to the reference signal is required to be greater than or equal to M, that is, the number of ports is required to be equal to the number of modulation symbols, and because the data streams have the same modulation and coding scheme, the number K of modulation symbol sets is equal to M^N, and ^ represents exponentiation. The number P of ports corresponding to the reference signal is greater than or equal to K, and preferably, P is a multiple of K.

In this embodiment, if power for sending the reference signal is different from power for sending the data, for example, the ratio is A, the A is required to be sent to the receiving end, and the receiving end multiplies the A by $y_{j,k}$ as the input of the mapping module. Alternatively, the ratio of the signal quality P1 of the received reference signal on a $k^{th}$ data stream to the signal quality P2 of the received data on the $k^{th}$ data stream is Ak, and the user multiplies Ak by $y_{j,k}$ as the input of the mapping module, where k=1, . . . , and Nr. The signal quality may be received power, a received signal-to-noise ratio, and a received signal-to-interference-plus-noise ratio.

In addition, theoretically, modulation symbol sets of N data streams can be recovered only with received data on one receiving antenna. A modulation symbol set recovered from a receiving antenna that exhibits the best performance among k=1, . . . , and Nr data streams (e.g., the one with the highest probability during classification or the modulation symbol set pointed to by the plurality of receiving antennas) can be adopted as the demodulation of data on the N data streams.

In this embodiment, at least one base station and one terminal are included. The base station sends N data streams. Assuming that the modulation and coding scheme used by the reference signal on each stream may be different, for example, QPSK is adopted for the first data stream, and therefore one of 4 modulation symbols is transmitted on each RE of the first data stream, such as $Q_{4,i}$, for simplicity, the subscript 4 is omitted, and it is denoted as $Q_{1i}$, where i=1, . . . , and $M_1$ and $M_1$=4. The modulation and coding scheme on the second data stream is 16QAM, which is denoted as $Q_{2i}$, where i=1, . . . , $M_2$, and $M_2$=16 Certainly, other modulation and coding schemes may also be adopted for other data streams. It is to be noted that the method in this embodiment may also be applied to other modulation and coding schemes without limitation, such as 16QAM and 64QAM. The corresponding Mk is the number of modulation symbols corresponding to the modulation and coding scheme, where k=1, . . . , and N. After the base station sends reference signal parameters and a reference signal, the terminal receives the reference signal parameters, and determines the reference signal according to the reference signal parameters including a pattern, a reception slot, and a sequence of the reference signal, thereby determining which modulation symbol is transmitted on each RE as a label. The terminal receives the reference signal, which is, for example, denoted as $Y_j=H_jR_j+N_j$ where $Y_j$, $H_j$, $R_j$, $N_j$ respectively represent a reference signal received on the $j^{th}$ RE for transmitting the reference signal, a channel, a modulation symbol set (one $R_i$ of K modulation symbol sets, where $R_i$ includes N modulation symbols, a $k^{th}$ modulation symbol is a modulation symbol on a $k^{th}$ stream, which may be modulation symbols with different modulation and coding schemes, for example, when N is 2, ($q_m$, $q_n$),n,m=i−1, . . . , and M, and i=1, . . . , and K), and interference noise. $Y_j$, $R_j$, $N_j$ are vectors of 1*Nr, and $H_j$ is a complex matrix of Nr*Nt, where Nr and Nt are respectively the number of antennas of the sending end and the receiving end, which are both greater than or equal to the number N of streams.

A $k^{th}$ element of the vector $Y_j$ may be represented by $$y_{j,k} = \sum_{i=1}^{Nt} h_{j,k,i} q_{j,i} + n_{j,k},$$

where $h_{j,k,i}$ respectively represent channels from an $i^{th}$ sending antenna of $H_j$ to a $k^{th}$ receiving antenna, $q_{j,i}$ represents a modulation symbol of an $i^{th}$ element of $R_j$, and $n_{j,k}$ represents a $k^{th}$ element of $N_j$. By inputting the received signal $y_{j,k}$ (k=1, . . . , and Nr) to the mapping module, such as the AI module, the machine learning module, the deep learning module, and other modules with classification or mapping functions, the received signal is inputted to the mapping module according to $y_{j,k}$ and a corresponding label $R_j$, where the label $R_j$ is also referred to as a modulation symbol set, such that received signal is mapped to one of K modulation symbol sets, $K=M_1*M_2* \ldots *M_N$, and each of K classifications corresponds to one modulation symbol set. Parameters of the mapping module are obtained by training a plurality of samples, such as values of neural network parameters corresponding to AI, j=1, . . . , and Nc, and Nc is the number of REs occupied by reference signals configured by the base station.

After the parameters of the mapping module are obtained, the base station transmits data, the transmitted data includes but not limited to one of PDSCH/PDCCH, and for the uplink, the terminal transmits the data, including but not limited to PUSCH and PUCCH. The value of the data sent by the sending end on the $i^{th}$ RE is $Y_i$. Because there are no labels in the data transmission stage, which one of modulation symbols the data is cannot be known. The transmitted data received at the receiving end is where $Y_i=H_iS_i+N_i$, where $Y_i$, $H_i$, $S_i$, $N_i$ respectively represent received data on a $k^{th}$ RE, a channel, a transmitted data vector (one of K modulation symbol sets), and interference noise. $Y_i$, $S_i$, $N_i$ are vectors of 1*Nr, and $H_i$ is a complex matrix of Nr*Nt, where Nr and Nt are respectively the number of antennas of the sending end and the receiving end, which are both greater than or equal to the number N of streams. By inputting the received data $$y_{i,k} = \sum_{j=1}^{Nt} h_{i,k,j}s_{i,j} + n_{i,k}$$

on each receiving antenna to the mapping module, a corresponding modulation symbol set is mapped out through the parameters of the mapping module, such as one of the K modulation symbol sets, where K=M^N, such that the data on the $i^{th}$ RE is demodulated, $h_{i,k,j}$ respectively represent channels from a $j^{th}$ sending antenna of $H_i$ to the $k^{th}$ receiving antenna, $s_{i,j}$ represents a modulation symbol of a $j^{th}$ element of $S_i$, and $n_{i,k}$ represents a $k^{th}$ element of $N_i$. By inputting the received signal $y_{i,k}$ (k=1, . . . , and Nr) to the mapping module, $y_{i,k}$ is mapped to one of the K modulation symbol sets. It is to be noted that the data streams may be a plurality of data streams of single-user MIMO or multiple-user MIMO. In this embodiment, the number P of ports corresponding to the reference signal is required to be greater than or equal to K, that is, the number of ports is at least required to be equal to the number of modulation symbols, and because the data streams have different modulation and coding schemes, the number of modulation symbol sets conforms to the formula: $K=M_1*M_2* \ldots *M_N$. The number P of ports corresponding to the reference signal is greater than or equal to K, and preferably. P is a multiple of K.

In this embodiment, if power for sending the reference signal is different from power for sending the data, for example, the ratio is A, the A is required to be sent to the receiving end, and the receiving end multiplies the A by $y_{j,k}$ as the input of the mapping module. Alternatively, the ratio of the signal quality P1 of the received reference signal on a $k^{th}$ data stream to the signal quality P2 of the received data on the $k^{th}$ data stream is Ak, and the user multiplies Ak by $y_{j,k}$ as the input of the mapping module, where k=1, . . . , and Nr. The signal quality may be received power, a received signal-to-noise ratio, and a received signal-to-interference-plus-noise ratio.

In addition, theoretically, modulation symbol sets of N data streams can be recovered only with received data on one receiving antenna. A modulation symbol set recovered from a receiving antenna that exhibits the best performance among k=1, . . . , and Nr data streams (e.g., the one with the highest probability during classification or the modulation symbol set pointed to by the plurality of receiving antennas) can be adopted as the demodulation of data on the N data streams.

In this embodiment, the reference signal sent by the sending end may be a train reference signal, such as a new reference signal designed for training parameters of the mapping module, and may also be an existing demodulation reference signal, such as DMRS in an NR. LTE, and a future communication system, which is used for estimating a channel on the RE where the DMRS is located. Based on the RE where the DMRS is located, a channel Hd on the RE carrying the transmitted data or control signal is obtained through interpolation and other methods. The data or control signal is demodulated based on the channel Hd on the RE carrying the transmitted data or control signal. In applications, the DMRS may be used for training the parameters of the mapping module, where the DMRS and the data are the same in modulation and coding scheme, the number of transmitted data streams, and/or pre-coding. DMRS corresponding to different users may be configured with the same number of ports, the same pattern, and the same sequence initial values.

Figure 7:
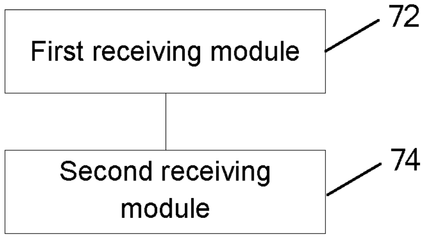
FIG. 7 is a first block diagram of a reference signal transmitting apparatus according to the present embodiment.

According to another aspect of an embodiment, a reference signal transmitting apparatus is further provided. FIG. 7 is a first block diagram of the reference signal transmitting apparatus according to the present embodiment. As shown in FIG. 7, the reference signal transmitting apparatus is applied to a terminal, and includes:

a first receiving module 72, configured to receive reference signal parameters, where the reference signal parameters at least include the number P of ports of a reference signal and a modulation and coding scheme of the reference signal, and the number P of ports of the reference signal is determined according to the modulation and coding scheme; and a second receiving module 74, configured to receive the reference signal according to the reference signal parameters.

In an embodiment, the apparatus further includes:

a third receiving module, configured to receive the modulation information; and a demodulation module, configured to determine, according to the obtained demodulation parameters, a modulation symbol corresponding to the modulation information.

In an embodiment, the reference signal parameters include the number P of ports of a reference signal and a modulation and coding scheme of the reference signal, where the number P of ports of the reference signal is determined according to the modulation and coding scheme.

In an embodiment, the reference signal parameters include a modulation and coding scheme and the number P of ports, where the number P of ports is determined by the number M of modulation symbols corresponding to the modulation and coding scheme, P≥M, and P and M are integers greater than 1.

In an embodiment, the reference signal parameters include the number N of transmitted data streams, a modulation and coding scheme, and the number P of ports, where the number P of ports is determined by the number N of data streams and the number M of modulation symbols corresponding to the modulation and coding scheme, P≥M^N, P and M are integers greater than 1, N is a positive integer, and ^ represents exponentiation.

In an embodiment, the reference signal parameters include the number N of data streams, a modulation and coding scheme, and the number P of ports, where the number P of ports is determined by the number $M_i$ of modulation symbols corresponding to the modulation and coding scheme on the N data streams, $P \geq M_1*M_2* \ldots *M_N$, P and $M_i$ are integers greater than 1, i=1, . . . , and N, and N is a positive integer.

In an embodiment, the second receiving module 74 includes:

a determining sub-module, configured to determine, according to the reference signal parameters, at least one of a pattern of the reference signal, a sequence of the reference signal, and a time domain category of the reference signal; and receive the reference signal on resource elements (REs) corresponding to at least one of the pattern of the reference signal, the sequence of the reference signal, and the time domain category of the reference signal, herein the time domain category of the reference signal includes periodic, aperiodic, and semi-persistent.

In an embodiment, the reference signal is used for demodulating the modulation information corresponding to the reference signal. Further, modulation and coding schemes corresponding to the reference signal and the modulation information are the same; and/or, pre-coding corresponding to the reference signal and the modulation information is the same; and/or, the number of data streams corresponding to the reference signal and the modulation information is the same; and/or, modulation and coding schemes corresponding to the reference signal and the modulation information on each corresponding data stream are the same, and/or, modulation symbol sets corresponding to the reference signal and the modulation information are the same.

In an embodiment, the apparatus further includes:

a fourth receiving module, configured to receive a power ratio parameter A, where the power ratio parameter A is a ratio of power for transmitting the reference signal to power for transmitting the modulation information; and an adjustment module, configured to adjust power of the modulation information according to the power ratio parameter A.

In an embodiment, the modulation information corresponds to one of K modulation symbol sets, where the modulation symbol set includes a combination of N modulation symbols, N is the number of data streams corresponding to the modulation information, N is an integer greater than or equal to 1, and K is an integer greater than 1.

In an embodiment, the number K of modulation symbol sets is determined by the number M of modulation symbols corresponding to the modulation and coding scheme, where K=M.

In an embodiment, the number K of modulation symbol sets is determined by the number M of modulation symbols corresponding to the modulation and coding scheme and the number N of transmitted data streams, where K=M^N, K and M are integers greater than 1, N is a positive integer, and ^ represents exponentiation.

In an embodiment, the number K of modulation symbol sets is determined by the number Mi of modulation symbols corresponding to the modulation and coding scheme on N data streams, where $K=M_1*M_2* \ldots *M_N$,K and $M_i$ are integers greater than 1, i=1, . . . , and N, and N is a positive integer.

In an embodiment, the number of reference signal ports corresponding to each of the K modulation symbol sets is the same.

In an embodiment, the reference signal includes at least one of a train reference signal and a demodulation reference signal.

Figure 8:
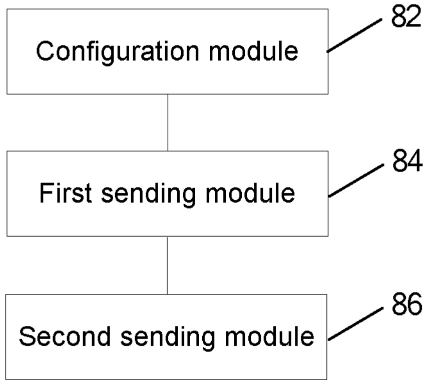
FIG. 8 is a second block diagram of a reference signal transmitting apparatus according to the present embodiment.

According to another aspect of an embodiment, a reference signal transmitting apparatus is further provided. FIG. 8 is a second block diagram of the reference signal transmitting apparatus according to the present embodiment. As shown in FIG. 8, the reference signal transmitting apparatus is applied to a base station, and includes:

a configuration module 82, configured to configure reference signal parameters, where the reference signal parameters at least include the number P of ports of a reference signal and a modulation and coding scheme of the reference signal, and the number P of ports of the reference signal is determined according to the modulation and coding scheme;

a first sending module 84, configured to send the reference signal parameters; and a second sending module 86, configured to send the reference signal according to the reference signal parameters.

In an embodiment, the apparatus further includes:

a third sending module, configured to send the modulation information, where the reference signal is used for indicating a terminal to obtain demodulation parameters corresponding to the demodulation information, and demodulate the demodulation information according to the demodulation parameters.

In an embodiment, the reference signal parameters include the number P of ports of a reference signal and a modulation and coding scheme of the reference signal, where the number P of ports of the reference signal is determined according to the modulation and coding scheme.

In an embodiment, the reference signal parameters include a modulation and coding scheme and the number P of ports, where the number P of ports is determined by the number M of modulation symbols corresponding to the modulation and coding scheme, P≥M, and P and M are integers greater than 1.

In an embodiment, the reference signal parameters include the number N of transmitted data streams, a modulation and coding scheme, and the number P of ports, where the number P of ports is determined by the number N of data streams and the number M of modulation symbols corresponding to the modulation and coding scheme, P≥M^N, P and M are integers greater than 1, N is a positive integer, and ^ represents exponentiation.

In an embodiment, the reference signal parameters include the number N of data streams, a modulation and coding scheme, and the number P of ports, where the number P of ports is determined by the number $M_i$ of modulation symbols corresponding to the modulation and coding scheme on the N data streams, $P \geq M_1*M_2* \ldots *M_N$, P and $M_i$ are integers greater than 1, i=1, . . . , and N, and N is a positive integer.

In an embodiment, the reference signal parameter is used for the terminal to determine at least one of a pattern of the reference signal, a sequence of the reference signal, and a time domain category of the reference signal; and receives the reference signal on resource elements (REs) corresponding to at least one of the pattern of the reference signal, the sequence of the reference signal, and the time domain category of the reference signal, where the time domain category of the reference signal includes periodic, aperiodic, and semi-persistent.

In an embodiment, the reference signal is used for demodulating the modulation information corresponding to the reference signal. Further, modulation and coding schemes corresponding to the reference signal and the modulation information are the same; and/or, pre-coding corresponding to the reference signal and the modulation information is the same; and/or, the number of data streams corresponding to the reference signal and the modulation information is the same; and/or, modulation and coding schemes corresponding to the reference signal and the modulation information on each corresponding data stream are the same, and/or, modulation symbol sets corresponding to the reference signal and the modulation information are the same.

In an embodiment, the apparatus further includes:

a fourth sending module, configured to send a power ratio parameter A to the terminal, where the power ratio parameter A is a ratio of power for transmitting the reference signal to power for transmitting the modulation information, and the power ratio parameter A is used for indicating the terminal to adjust the power of the modulation information.

In an embodiment, the modulation information corresponds to one of K modulation symbol sets, where the modulation symbol set includes a combination of N modulation symbols, N is the number of data streams corresponding to the modulation information, N is an integer greater than or equal to 1, and K is an integer greater than 1.

In an embodiment, the number K of modulation symbol sets is determined by the number M of modulation symbols corresponding to the modulation and coding scheme, where K=M.

In an embodiment, the number K of modulation symbol sets is determined by the number M of modulation symbols corresponding to the modulation and coding scheme and the number N of transmitted data streams, where K=M^N, K and M are integers greater than 1, N is a positive integer, and ^ represents exponentiation.

In an embodiment, the number K of modulation symbol sets is determined by the number $M_i$ of modulation symbols corresponding to the modulation and coding scheme on N data streams, where $K=M_1*M_2* \ldots *M_N$, K and $M_i$ are integers greater than 1, i=1, . . . , and N, and N is a positive integer.

In an embodiment, the number of reference signal ports corresponding to each of the K modulation symbol sets is the same.

In an embodiment, the reference signal includes at least one of a train reference signal and a demodulation reference signal.

An embodiment of the present disclosure further provides a computer-readable storage medium, and the computer-readable storage medium stores a computer program. The computer program is configured to perform, when executed by a processor, the steps in any one of the above method embodiments.

In an exemplary embodiment, the above computer-readable storage medium may include but not limited to: a U disk, a read-only memory (ROM), a random access memory (RAM), a mobile hard disk, a magnetic disk or a compact disc or other media capable of storing the computer program.

An embodiment of the present disclosure further provides an electronic device including a memory and a processor. The memory stores a computer program, and the processor is configured to execute the computer program so as to perform the steps in any one of the above method embodiments.

In an exemplary embodiment, the above electronic device may further include a transmission device and an input and output device. The transmission device is connected with the above processor, and the input and output device is connected with the above processor.

For specific examples in this embodiment, reference may be made to the examples described in the above embodiments and exemplary implementations, which will not be described in detail in this embodiment.

Obviously, those skilled in the art should understand that the modules or steps in the present disclosure may be implemented through a universal computing device, which may be centralized in a single computing device or distributed over a network formed by multiple computing devices, and may be implemented by executable program code of the computing device, such that the modules or steps may be stored in a storage apparatus to be executed by the computing device; and in some cases, the shown or described steps may be executed in a different order than presented here, or the modules or steps may be made into various integrated circuit modules, or more of the modules or steps may be made into a single integrated circuit module to be implemented. Therefore, the present disclosure is not limited to any specific hardware and software combination.

The above contents are merely preferred embodiments of the present disclosure, and are not intended to limit the present disclosure, and for those skilled in the art, the present disclosure may have various modifications and changes. Any modification, equivalent replacement, improvement, etc. made within the principle of the present disclosure shall fall within the scope of protection of the present disclosure.

What is claimed is:

1. A method for transmitting a reference signal, applied to a terminal, comprising:

receiving reference signal parameters, wherein the reference signal parameters at least comprise the number P of ports of a reference signal, and a modulation and coding scheme of the reference signal, wherein the number P of ports of the reference signal is determined according to the modulation and coding scheme; and receiving the reference signal according to the reference signal parameters, wherein the reference signal is configured to demodulate modulation information corresponding to the reference signal.

2. The method according to claim 1, wherein the number P of ports is determined by the number M of modulation symbols corresponding to the modulation and coding scheme, P≥M, and P and M are integers greater than 1.

3. The method according to claim 1, wherein the reference signal parameters further comprise the number N of transmitted data streams, wherein the number P of ports is determined by the number N of data streams and the number M of modulation symbols corresponding to the modulation and coding scheme, P≥M^N, P and M are integers greater than 1, N is a positive integer, and ^ represents exponentiation.

4. The method according to claim 1, wherein the reference signal parameters further comprise the number N of data streams, wherein the number P of ports is determined by the number $M_i$ of modulation symbols corresponding to the modulation and coding scheme on the N data streams, $P \geq M_1*M_2* \ldots *M_N$ P and $M_i$ are integers greater than 1, i=1, . . . , and N, and N is a positive integer.

5. The method according to claim 1, wherein receiving the reference signal according to the reference signal parameters comprises:

determining, according to the reference signal parameters, at least one of a pattern of the reference signal, a sequence of the reference signal, and a time domain category of the reference signal; and receiving the reference signal on resource elements (REs) determined according to at least one of the pattern of the reference signal, the sequence of the reference signal, and the time domain category of the reference signal, wherein the time domain category of the reference signal comprises periodic, aperiodic, and semi-persistent.

6. The method according to claim 1, wherein modulation and coding schemes corresponding to the reference signal and the modulation information are the same; and/or, pre-coding corresponding to the reference signal and the modulation information is the same; and/or, the number of data streams corresponding to the reference signal and the modulation information is the same; and/or, modulation and coding schemes corresponding to the reference signal and the modulation information on each corresponding data stream are the same; and/or modulation symbol sets corresponding to the reference signal and the modulation information are the same.

7. The method according to claim 1, wherein the method further comprises:

receiving a power ratio parameter A, wherein the power ratio parameter A is a ratio of power for transmitting the reference signal to power for transmitting the modulation information; and adjusting power of the modulation information according to the power ratio parameter A.

8. The method according to claim 1, wherein the modulation information corresponds to one of K modulation symbol sets, wherein the modulation symbol set comprises a combination of N modulation symbols, N is an integer greater than or equal to 1, and K is an integer greater than 1.

9. The method according to claim 8, wherein the number K of the modulation symbol sets is determined by the number M of modulation symbols corresponding to the modulation and coding scheme, wherein K=M.

10. The method according to claim 8, wherein the number K of the modulation symbol sets is determined by the number M of modulation symbols corresponding to the modulation and coding scheme and the number N of transmitted data streams, wherein K=M^N, K and M are integers greater than 1, N is a positive integer, and ^ represents exponentiation.

11. The method according to claim 8, wherein the number K of the modulation symbol sets is determined by the number Mi of modulation symbols corresponding to the modulation and coding scheme on N data streams, wherein $K=M_1*M_2* \ldots *M_N$ K and $M_i$ are integers greater than 1, i=1, . . . , and N, and N is a positive integer.

12. The method according to claim 8, wherein the number of reference signal ports corresponding to each of the K modulation symbol sets is the same.

13. A method for transmitting a reference signal, applied to a base station, comprising:

configuring reference signal parameters, wherein the reference signal parameters at least comprise the number P of ports of a reference signal and a modulation and coding scheme of the reference signal, and the number P of ports of the reference signal is determined according to the modulation and coding scheme;

sending the reference signal parameters; and sending the reference signal according to the reference signal parameters, wherein the reference signal is configured to demodulate modulation information corresponding to the reference signal.

14. An apparatus for transmitting a reference signal applied to a terminal, comprising:

a first receiving module, configured to receive reference signal parameters, wherein the reference signal parameters at least comprise the number P of ports of a reference signal and a modulation and coding scheme of the reference signal, and the number P of ports of the reference signal is determined according to the modulation and coding scheme; and a second receiving module, configured to receive the reference signal according to the reference signal parameters, wherein the reference signal is configured to demodulate modulation information corresponding to the reference signal.

15. A computer non-transitory readable storage medium, wherein the storage medium stores a computer program, and the computer program is configured to cause, when executed by a processor, the processor to perform the method as claimed in claim 1.

16. An electronic device, comprising a memory and a processor, wherein the memory stores a computer program, and the processor is configured to execute the computer program so as to perform the method as claimed in claim 1.

17. A computer non-transitory readable storage medium, wherein the storage medium stores a computer program, and the computer program is configured to cause, when executed by a processor, the processor to perform the method as claimed in claim 2.

18. A computer non-transitory readable storage medium, wherein the storage medium stores a computer program, and the computer program is configured to cause, when executed by a processor, the processor to perform the method as claimed in claim 13.

19. An electronic device, comprising a memory and a processor, wherein the memory stores a computer program, and the processor is configured to execute the computer program so as to perform the method as claimed in claim 13.

* * * * *